United States Patent Office 3,513,673
Patented May 26, 1970

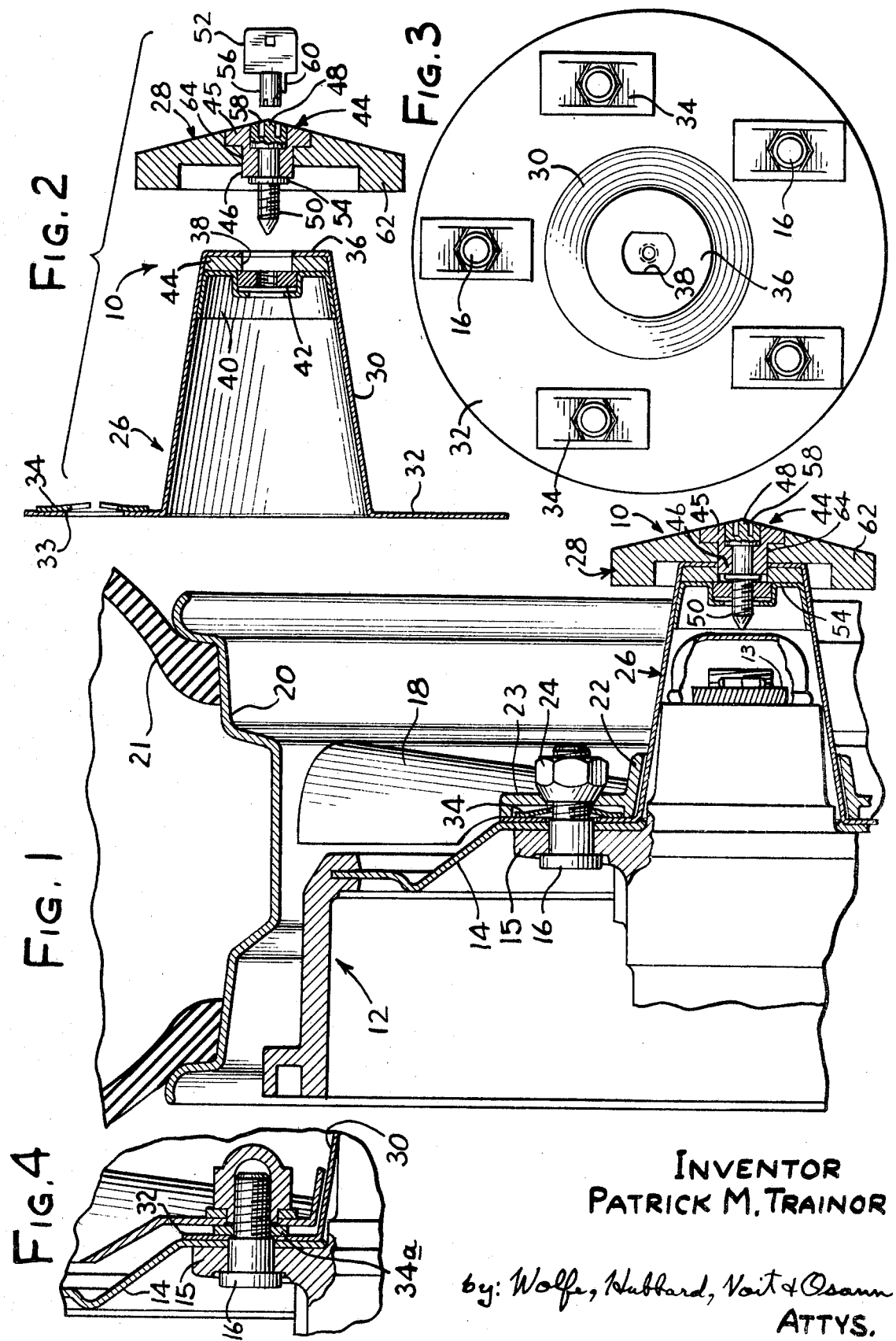

3,513,673
WHEEL LOCK
Patrick M. Trainor, Chicago, Ill., assignor to
Shapiro, Levine & Crane, Chicago, Ill.
Filed Sept. 20, 1967, Ser. No. 669,146
Int. Cl. E05b 65/12
U.S. Cl. 70—259
2 Claims

ABSTRACT OF THE DISCLOSURE

A key actuable vehicle wheel locking apparatus for preventing removal of the wheel from the vehicle wheel mounting by unauthorized persons and yet which contributes to the overall attractiveness and styling of the wheel, without affecting balance of wheel.

---

The present invention relates generally to locking apparatus for securement of vehicle wheels and more particularly, to a key actuable locking apparatus for preventing unauthorized removal of automotive vehicle wheels in an improved and fool-proof manner.

It has heretofore been attempted to lock automotive vehicle wheels and the like to the vehicle wheel mountings with a stud lock that replaces one or more of the conventionally utilized nuts that hold the wheel. However, such stud locks have not been found to be completely effective in preventing unauthorized removal of the vehicle wheels. With the increased usage of the relatively expensive so called "mag-type" wheels, there is an even greater concern for providing a locking arrangement to prevent the wheel from being removed by unauthorized persons, yet such locking arrangement must not interfere with the attractive appearance associated with such custom wheels.

Accordingly, it is a primary object of the present invention to provide an improved locking apparatus for positive and fool-proof securement of vehicle wheels, which prevent removal by unauthorized persons and yet which contribute to the overall attractiveness and styling of the wheel.

Another object of the present invention is to provide an improved wheel lock which will fit virtually all automotive vehicle wheels and can be easily and readily installed with a minimum of labor, tools, and skill required. A related object is to provide a vehicle wheel lock which can be used on either the front or rear wheels of automobiles. In this connection it is an object to provide a vehicle wheel lock which maintains uniform appearance of both front and rear wheels when installed.

It is still another object of the present invention to provide a wheel lock which readily fits in with the decorative aspect of the present custom or commercial wheel designs.

A more specific object of the present invention is to provide a wheel lock which is of maximum security including a key actuated locking device and particularly a cylindrical lock of the type having axial tumblers and which is controlled by a tubular key.

Other objects and advantages of the invention will become apparent as the following description proceeds, taken in conjunction with the accompanying drawings, in which:

FIG. 1 is a radial, fragmentary, sectional, elevational view through a vehicle front wheel structure showing the wheel lock of the present invention applied thereto;

FIG. 2 is a view of a wheel lock apparatus of the present invention, partly in section, with the component parts being shown in exploded relation;

FIG. 3 is a top view of the base cone for the locking apparatus of the present invention;

FIG. 4 is a fragmentary sectional view of the wheel lock base portion, but with a slightly modified arrangement for attachment of the base cone to the front wheel brake drum being here shown.

While the invention is susceptible of various modifications and alternative forms, specific embodiments thereof have been shown by way of example in the drawings and will herein be described in detail. It should be understood, however, that it is not intended thereby to limit the invention to the particular forms disclosed, but, on the contrary, the invention is to cover all modifications, equivalents, and alternatives falling within the spirit and scope of the invention as expressed in the appended claims.

Referring now to the drawings, there is illustrated in FIG. 1 an exemplary wheel locking apparatus generally indicated at 10, which is constructed and arranged to prevent unauthorized removal of a vehicle wheel mounted on the wheel mounting which in this instance is the brake drum structure indicated a 12 and which is also constructed to prevent unauthorized removal of axle hub nut 13 of the vehicle front wheel. As here shown, the brake drum structure 12, as is typical for a front wheel of an automobile, includes a brake drum 14 mounted upon an axle hub flange 15 to which there is mounted a plurality of bolts or studs 16, usually five in number. The wheel body portion which may be in the form of a spider or spokes 18 and the like attached at its outer periphery to a base flange 20 of a multi-flange drop center tire rim constructed and arranged to carry a tire 21 includes a central hub 22 and a flange 23 provided with openings that correspondingly receive studs 16 for mounting the wheel to the brake drum.

For the purpose of so mounting the wheel to the brake drum, lug nuts 24 and the like are provided. Of course, special lug nuts 25 and washers may also be used as shown in FIG. 4. The wheel may be formed of any suitable material or design such as multiple steel components welded together or as in the case of the "mag-type" wheels it may be constructed of a high strength aluminum-titanium alloy, cast in a one piece mold.

In carrying out the present invention, the locking apparatus 10 comprises base member 26 adapted to be secured to the brake drum wheel mounting and a locking head 28 including a pin tumbler lock which is adapted to be releasably secured to the base member. To this end, as best viewed in FIGS. 2 and 3, conjointly, the exemplary base member 26 includes an elongated generally frustoconical shaped housing 30 having an annular flange 32 adjacent the base of the housing with openings 33 formed in the flange equal in number and adapted to receive studs 16 projecting from the brake drum 12. For the purpose of securing the base member 26 to the brake drum, there is provided spring fasteners 34 which engage the threaded shanks of studs 16. Alternatively, as shown in FIG. 4 relatively thin nuts 34a may be employed to secure the base member 26 to the brake drum via studs 16. The openings in the base member which receive the wheel studs 16 may also be in the form of slots so that the base member may be universally applied to mountings having the studs at different radii.

Referring to FIGS. 2 and 3, the end 36 of base member housing 30 includes a centrally disposed recessed opening 38 which is generally of a double D configuration. A frustoconical sleeve member 40 telescoped within the housing 30 and suitably secured thereto, such as by spot welding or the like, carries a caged nut 42 disposed centrally of the opening 38. An insert member 44 also having a central opening of double D configuration is provided for imparting additional rigidity to the base member. It will be apparent, however, that other forms of reinforcement and construction of the uppermost portion of the housing 30 may be utilized without departing from the present invention. For example, the top portion may be integrally formed with the housing 30 and a drilled and tapped opening may be utilized in place of the caged nut 42.

Turning to the locking head portion 28, as shown in FIGS. 1 and 2, there is provided a cylinder lock 44 contained in a case 45, the latter being generally T-shaped in cross-section. The reduced diameter end portion 46 of the case 45 is dimensioned with a corresponding double D shape to that of opening 38 in the upper end of the base member 30. The cylinder 48 of the lock 44 is received in a bore in the casing 45 and has an outwardly projecting threaded shaft portion 50 which is adapted to be threadably received by the nut 42 upon rotation of the cylinder 48 when the key 52 is inserted in the lock.

In order to confine the cylinder 48 within the casing 45, there is provided a spring clip ring 54 which cooperates with the end portion 46 of the casing 45.

In the preferred form of lock suitable for use with the present invention, the lock is an axial tumbler type of pin tumbler lock operated by a cylindrical shaped key 56. For details of the axial tumbler type lock, cross reference is made to my copending application Ser. No. 656,526 filed July 20, 1967, for Locking Bayonet Connector Securement.

Briefly stated, the lock includes an annular opening or key socket 58 which receives the cylindrical key portion 56. Disposed inwardly of the key socket 58 is an annular array of tumbler wells (not shown) which contain a plurality of longitudinally extending tumblers and cooperating spring biased drivers which normally prevent rotation of the cylinder 48 when the key is withdrawn from the cylinder. When the key is inserted into the key socket 58, proper positioning being insured by an index mark 60 on the key handle that is aligned with a corresponding index mark on the front face of the cylinder, and with the key fully inserted the key drives the tumblers back to where their rear ends are on an aligned plane allowing the cylinder to be free for tumbler propelled rotation, by the key.

The axial tumbler type of pin tumbler lock is preferred because with the key inserted, it not only allows 360° rotation of the lock cylinder, but the key can be removed at virtually any position of such rotation and the lock is secure. The key may then be again inserted with the lock at the same position which the key had been previously removed at. In addition, this type of lock provides the maximum amount of security obtainable with tumbler locks. Since the tumblers are the fulcrum points the lock is virtually pick-proof.

In accordance with another aspect of the present invention, the lock casing 45 is recessed into suitable counterbores formed on a cap member 62 which overlies the base member and is dimensioned so as to be larger than the opening in hub member 22 of the vehicle wheel. The cap, of course, may take any number of decorative shapes or stylings such, for example, as to completely cover the wheel like a "hub cap," or any other suitable design such as simulated spinners or "knock-offs."

The recessed opening 64 in the cap 62 is circular shaped and the cap is lightly press fit to the lock case 45 which is also circular in cross-section. The lower portion 46 of lock case 45 is of a corresponding double D shape to that of opening 38 in the base member 26. Thus, any attempt to apply gripping tools and the like to the cap 62 only result in relative rotation between the lock case and the cap.

Having in mind the foregoing structural details of the present wheel lock, a brief explanation of the installation thereof will serve to facilitate an understanding of the present invention. To this end, reference is first made to FIGS. 1 and 2, conjointly, wherein it can be seen that the installation of the present wheel lock requires removal of the wheel from the brake drum 12 by removing the lug nuts 24 in the usual manner. The base member 26 of the present wheel lock is then fitted into place so that the studs 16 of the brake drum project through the corresponding openings 33 and flange 32 of the base member. Spring fasteners 34 or in the alternative nuts 34a (FIG. 4) are applied to the studs to secure the base member in position. The wheel then is again remounted to the brake drum with the elongated portion 30 of base member 26 passing through the central opening of the wheel hub 22. With the key 52 inserted into lock 48, the locking head portion 28 of the wheel lock is attached to the base member by rotating the key which in turn rotates threaded shank 50 to threadably secure the latter into nut 42 until the head 28 is firmly in position against the outer surface of the base member. When the key is removed, the wheel lock is securely in place and unauthorized removal of the wheel is prevented in that even if the lug nuts 24 are removed, the wheel cannot be made to pass beyond the locking head 28 which is of a greater dimension than the opening in the wheel hub.

It should be understood that while the foregoing description has been made with reference to a "brake drum" for mounting the vehicle wheel, it is not intended that the application of the present wheel lock be limited to vehicles having internal expanding brakes or to the front wheel. On the contrary, the wheel lock of the present invention may be utilized with vehicles having other forms of brakes and wherein the wheel is mounted on the disk brake housing or like wheel supporting means.

I claim as my invention:

1. In combination with a vehicle wheel assembly having wheel mounting means including a plurality of circumferentially disposed studs, a multi-flange tire rim including a body portion having a centrally disposed hub having an opening therein and nut means for securing said tire rim to said mounting means, a wheel locking apparatus comprising a base member secured to said wheel mounting means, said base member having a flange portion and an elongated housing portion protruding from said flange, said elongated housing portion passing through said hub opening when the tire rim is secured to the wheel mounting means, first securement means associated with the base member housing portion, locking means having a housing including an outwardly projecting portion, a pin tumbler lock mounted in said locking means housing portion having a rotatable cylinder with its front end accessible at the outer surface of said locking means housing to be rotated by means of a proper key insertable into the lock, a second securement means mounted as a coaxial rear end portion of said cylinder and projecting rearwardly therefrom, means associated with each of said first and second securement members cooperable upon rotation of said lock cylinder to establish a connection therebetween and said locking means housing projecting portion being of a greater dimension than the diameter of said hub opening so that when said tire rim and hub is disposed over said base member housing portion and said locking means is secured to said base member removal of the wheel is prevented.

2. A wheel locking apparatus as claimed in claim 1 wherein said cylinder lock is contained in a casing being generally T shaped in cross-section, said casing being recessed into a separable cap member dimensioned to overlie said base member housing, an upper portion of said casing being circular in cross section and a lower portion of said casing protruding through said cap member being of a substantially DD shaped cross section and means including an opening in said base member housing portion having a configuration corresponding to said lower portion of the lock case and the base member when said locking means is secured to said base member.

References Cited

UNITED STATES PATENTS

| 1,186,912 | 6/1916 | Klein | 70—379 |
| 2,993,361 | 7/1961 | Van Lahr | 70—363 |
| 3,170,733 | 2/1965 | Lomme | 301—37 |
| 3,316,742 | 5/1967 | Wellekens | 70—379 |

MARVIN A. CHAMPION, Primary Examiner

R. L. WOLFE, Assistant Examiner